(12) United States Patent
Pechacek et al.

(10) Patent No.: US 11,593,383 B1
(45) Date of Patent: Feb. 28, 2023

(54) APPARATUSES, METHODS, AND COMPUTER PROGRAM PRODUCTS FOR TRIGGERING COMPONENT WORKFLOWS WITHIN A MULTI-COMPONENT SYSTEM

(71) Applicants: ATLASSIAN PTY LTD., Sydney (AU); ATLASSIAN, INC., San Francisco, CA (US)

(72) Inventors: Taylor Pechacek, Sydney (AU); Kelvin Yap, San Francisco, CA (US); Patrick Hill, Austin, TX (US); Daniel Salet, Mountain View, CA (US); Jessica Brooke, San Francisco, CA (US); Andrei Bocan, San Francisco, CA (US); Dharam Gollapudi, Mountain View, CA (US); James Bobowski, Oakland, CA (US); Jiajun Zhu, Mountain View, CA (US); Sarah Bland, Austin, TX (US); Shivam Dave, Mountain View, CA (US); Steven Berry, Mountain View, CA (US); Tré Lannon, San Francisco, CA (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/659,549

(22) Filed: Apr. 18, 2022

(51) Int. Cl.
| | |
|---|---|
| *G06F 7/00* | (2006.01) |
| *G06F 16/2457* | (2019.01) |
| *G06F 16/23* | (2019.01) |
| *G06F 16/22* | (2019.01) |
| *G06F 11/07* | (2006.01) |
| *G06F 16/2455* | (2019.01) |

(52) U.S. Cl.
CPC .... *G06F 16/24573* (2019.01); *G06F 11/0793* (2013.01); *G06F 16/2237* (2019.01); *G06F 16/2365* (2019.01); *G06F 16/24568* (2019.01)

(58) Field of Classification Search
CPC ......... G06F 16/24573; G06F 16/24568; G06F 16/2237; G06F 16/2365; G06F 11/0793
USPC .................................................. 707/600–899
See application file for complete search history.

(56) References Cited

U.S. PATENT DOCUMENTS 11,263,267 B1 * 3/2022 Zittel ...................... G06F 8/433

* cited by examiner

*Primary Examiner* — Isaac M Woo
(74) *Attorney, Agent, or Firm* — Alston & Bird LLP

(57) ABSTRACT

Methods, apparatuses, or computer program products provide for triggering component workflows within a multi-component system. An update to one or more component metadata records of a component metadata vector associated with a first component identifier may be received. The component metadata vector may include a plurality of records. Each record of the plurality of records may include a unique component metadata record identifier and a component metadata value. The component metadata vector associated with the first component identifier may be traversed after updating the one or more component metadata records. Based at least in part on detecting a component metadata condition associated with a component workflow trigger associated with the first component identifier, a first component workflow action of a first component workflow action series comprising a plurality of component workflow actions may be executed. Furthermore, a component workflow trigger notification may be transmitted to a first computing device.

30 Claims, 7 Drawing Sheets

APPARATUSES, METHODS, AND COMPUTER PROGRAM PRODUCTS FOR TRIGGERING COMPONENT WORKFLOWS WITHIN A MULTI-COMPONENT SYSTEM

BACKGROUND

Conventional systems for managing components of systems in which multiple components interact suffer from many deficiencies and problems. Through applied effort, ingenuity, and innovation, these identified deficiencies and problems have been solved by developing solutions that are configured in accordance with the embodiments of the present disclosure, many examples of which are described in detail herein.

BRIEF SUMMARY

Embodiments of the present disclosure relate to apparatuses, methods, and computer program products for triggering component workflows within a multi-component system. In example embodiments, a system for triggering component workflows within a multi-component system includes one or more computers and one or more storage devices storing instructions that are operable, when executed by the one or more computers, to cause the one or more computers to receive an update to one or more component metadata records of a component metadata vector associated with a first component identifier, the component metadata vector comprising a plurality of records each comprising a unique component metadata record identifier and a component metadata value. In embodiments, the system comprising one or more computers and one or more storage devices storing instructions that are further operable, when executed by the one or more computers, to cause the one or more computers to traverse the component metadata vector associated with the first component identifier after updating the one or more component metadata records. In embodiments, the system comprising one or more computers and one or more storage devices storing instructions that are further operable, when executed by the one or more computers, to cause the one or more computers to, based at least in part on detecting a component metadata condition associated with a component workflow trigger associated with the first component identifier, execute a first component workflow action of a first component workflow action series comprising a plurality of component workflow actions. In embodiments, the system comprising one or more computers and one or more storage devices storing instructions that are further operable, when executed by the one or more computers, to cause the one or more computers to transmit a component workflow trigger notification to a first computing device.

In embodiments, the system comprising one or more computers and one or more storage devices storing instructions that are further operable, when executed by the one or more computers, to cause the one or more computers to update the component metadata vector associated with the first component identifier in a component metadata repository based at least in part on the update.

In embodiments, the first component workflow action comprises a corrective action.

In embodiments, the corrective action comprises disabling one or more related components upon which a first component associated with the first component identifier is dependent.

In embodiments, the component metadata condition comprises missing or incomplete component metadata.

In embodiments, the component metadata condition comprises an unreliable component upon which a first component associated with the first component is dependent.

In embodiments, the component metadata condition or the first component workflow action series is configurable.

In embodiments, the component metadata vector comprises a plurality of component metadata conditions.

In embodiments, the update to the one or more component metadata records is received based at least in part on an event stream associated with a first component associated with the first component identifier.

In embodiments, the component metadata condition comprises a performance metric that is below a trigger threshold.

Various other embodiments are also described in the following detailed description and in the attached claims.

BRIEF DESCRIPTION OF THE SEVERAL VIEW OF THE DRAWINGS

Having thus described some embodiments in general terms, references will now be made to the accompanying drawings, which are not drawn to scale, and wherein:

DETAILED DESCRIPTION OF VARIOUS EMBODIMENTS

Figure 1A:
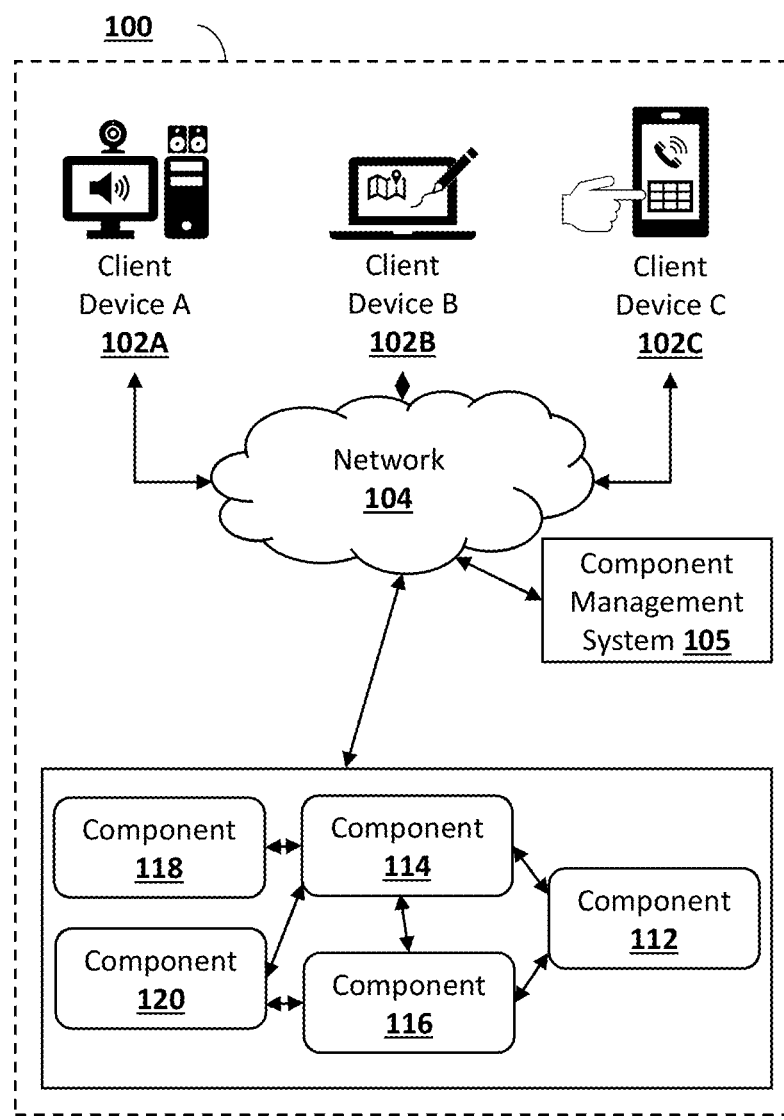
FIGS. 1A is a block diagram of an example component management system within which one or more embodiments of the present disclosure may operate.

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure address technical problems associated with efficiently and reliably managing components of a multi-component system where multiple components/resources and/or layers of components/resources interact with one another in several complex manners. The disclosed techniques can be utilized by a component management system to provide automated detection of certain conditions associated with an application component and automated triggering/initiation of application component workflows that enhance effectiveness and/or efficiency of performing multi-component system management with respect to complex multi-component systems.

A complex application framework (e.g., a cloud application framework) is typically characterized by a large number of the application components (e.g., services) that are offered by the application framework. Those application components typically include a large number of frontend application components and/or a large number of backend application components. Because of the numerosity of the application components that are typically offered by a complex application framework, a large number of data objects (e.g., metadata) may be generated at a time interval, subsets of which may relate to events, incidents, changes, component requests, scheduling, alerting, workflows and/or other dynamic data associated with the application framework. As such, managing data and/or computing resources related to application components of an application framework is generally difficult. Furthermore, it is generally difficult to address incidents or anomalies regarding application components of an application framework. For example, consider a scenario in which it is desirable to implement a risk assessment or promptly and efficiently correct an anomaly/incident related to an application component associated with an application framework. For example, consider a scenario where it is desirable to block a pipeline, disable a component, disable a service, and/or disable a library in the case of an incident.

Typically, management of application components of an application framework involves manual employment of spreadsheets and/or central storage with component-specific programming language files (e.g., JavaScript Object Notation (JSON) files, YAML files, etc.). However, typical techniques for managing application components of an application framework do not provide an opinionated data-model for tracking application components, detecting certain conditions (e.g., anomalies) associated with components and triggering a workflow. Furthermore, typical techniques for managing application components of an application framework generally lack automation to facilitate the managing (e.g., detecting a metadata condition associated with a component and triggering a component workflow in response).

As illustrated above, without being able to automate triggering workflow actions based on detecting certain conditions associated with a component, a data management system will be forced to address data objects individually, which results in the need for performing additional processing operations and thus using unnecessary computational resources. This problem is exasperated as the number of application components in a complex multi-component system grows larger, which in turn leads to the big data processing problem of real-time processing of a large number of data objects generated as a result of an event associated with the complex multi-component system. As this description shows, a conventional management approach that relies on manual processing and/or individual processing of data objects generated by application components is not scalable, as it becomes increasingly inefficient to process data objects manually and/or on an individual level as the complexity of a multi-component system grows.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a component made available by a server. The server is often, but not always, on another computer system, in which case the client accesses the component by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "server computing device" refers to a combination of computer hardware and/or software that is configured to provide a component to a client device. An example of a server computing device is the component management system 105 of FIGS. 1A-B. In some embodiments, a server computing device communicates with one or more client computing devices using one or more computer networks.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "application framework" refers to a computing environment associated with one or more computing devices and one or more applications, where the environment enables the discovery of insights associated with components supporting at least one application. In some embodiments, the components are associated directly or indirectly with an application supported by the components. In some embodiments, the components can support the application over one or more communication networks. The application framework can include one or more applications to generate and update a repository of collected information for each component (e.g., component metadata repository). Accordingly, the application framework can provide for the collection of information, in the form of component objects, to generate work graphs associated with one or more components. In some embodiments, applications can compare information collected for a component with information collected for another component or a predefined threshold criteria.

The term "application," "app," or similar terms refer to a computer program or group of computer programs designed for use by and interaction with one or more networked or remote computing devices. In some embodiments, an application refers to a mobile application, a desktop application, a command line interface (CLI) tool, or another type of application. Examples of an application comprise workflow engines, component desk incident management, team collaboration suites, cloud components, word processors, spreadsheets, accounting applications, web browsers, email clients, media players, file viewers, videogames, and photo/video editors. An application can be supported by one or more components either via direct communication with the component or indirectly by relying on a component that is in turn supported by one or more other components.

The term "component" refers to a computer functionality or a set of computer functionalities, such as the retrieval of specified information or the execution of a set of operations, with a purpose that different clients can reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task. In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open source API definition format, an internal developer tool, web based HTTP components, databased components, and asynchronous message queues which facilitate component-to-component communications. In some embodiments, a component can represent an operation with a specified outcome and can further be a self-contained computer program. In some embodiments, a component from the perspective of the client (e.g., another component, application, etc.) can be a black box (e.g., meaning that the client need not be aware of the component's inner workings). In some embodiments, a component may be associated with a type of feature, an executable code, two or more interconnected components, and/or another type of component associated with an application framework. In some embodiments, a component may correspond to a service. Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "service" refers to a type of component. In some embodiments, a service provides a visual representation of one or more data structures. In some embodiments, a service is configured for viewing data, searching for data, creating data, updating data, managing relationships among data, assigning attributes related to data, and/or storing data associated with one or more data structures. In some embodiments, a service is configured as a system, tool or product to facilitate viewing data, searching for data, creating data, updating data, managing relationships among data, assigning attributes related to data, and/or storing data associated with one or more data structures. In some embodiments, a service comprises a set of metadata attributes associated with a technical capability, a technical configuration, an application capability, an application configuration, and/or another metadata attribute. In some embodiments, a service is published to one or more client devices via one or more APIs. In some embodiments, a service is a logical representation of an application stack. In some embodiments, a service corresponds to one or more microservices.

The term "microservices" refers to a set of services that are interconnected and independently configured to provide a monolith service. In some embodiments, a microservice is configured with one or more APIs integrated with one or more other microservices and/or one or more other applications. In some embodiments, a microservice is a single-function module with a defined set of interfaces and/or a defined set of operations configured to integrate with one or more other microservices and/or one or more other applications to provide a monolith service.

The term "library" refers to a collection of objects (e.g., a collection of component objects, a collection of service objects, etc.), a collection of functions, and/or a collection of processing threads associated with one or more components.

The term "component metadata vector" refers to a data structure that represents at least one property (e.g., piece of metadata) associated with a component. The component metadata vector can take the structural form of a vector or other appropriate data structure for representing the component and its associated properties and/or data. For example, a component metadata vector can represent a web component provided by a server to a plurality of other computing devices over a wired and/or wireless network and, as such, the component metadata vector can contain properties associated with the web component such as an IP address, API, or the like. Component metadata vector can be configured to follow a predefined format, such that an application can collect and store substantially similar data for each represented component in its respective component metadata vector. Data or metadata collected for each component to be represented by an associated component metadata vector can be collected directly from the component itself, a computing device associated with the component, and/or from an existing repository of component objects. In some embodiments, a component metadata vector can also represent an application or other non-component computer program that utilizes at least one component. In some embodiments, the component metadata vector may comprise a component metadata vector identifier and an attribute (e.g., a component metadata value), the attribute comprising an array of name and value pairs with properties associated with the component. For example, a component metadata vector may be structured as: Component {Id: graph-component-1 Attributes: [{name: geolocations, value: [us, eu]}, {name: level, value: HIGH_PRIORITY}, ]}. Each record of a component metadata vector may be associated with a component metadata record identifier, which refers to one or more items of data by which a component metadata record may be uniquely identified.

The term "component identifier" refers to one or more items of data by which a particular component may be uniquely identified.

The terms "internal component," "internal resource," or similar terms refer to a program, application, platform, or component that is configured by a developer to provide functionality to another one or more of their programs, applications, platforms, or components, either directly or indirectly through one or more other components, as opposed to using an external component. Internal components operate on a compiled code base or repository that is at least partially shared by an application which utilizes the functionality provided by the internal component. In some embodiments, the application code base and the internal component code base are hosted on the same computing device or across an intranet of computing devices. An application communicates with internal components within a shared architectural programming layer without external network or firewall separation. In some embodiments, an internal component is used only within the application layer which utilizes the internal components functionality. Information related to internal components can be collected and compiled into component objects which can also be referred to as internal component objects. An example embodiment of an internal component is a load balancer configured for routing and mapping API and/or component locations. Internal components may be configured for information-based shard routing, or in other words, routing and mapping API and/or component locations based on predefined custom component requirements associated with an application. For example, an internal component may be configured to identify where communication traffic originates from and then reply to the communications utilizing another component for reply communication.

The terms "external component," "external resource," "remote resource," or similar terms refer to a program, application, platform, or component that is configured to communicate with another program, application, platform, or component via a network architecture. In some embodiments, communications between an external component and an application calling the external component takes place through a firewall and/or other network security features. The external component operates on a compiled code base or repository that is separate and distinct from that which supports the application calling the external component. The external components of some embodiments generate data or otherwise provide usable functionality to an application calling the external component. In other embodiments, the application calling the external component passes data to the external component. In some embodiments, the external component may communicate with an application calling the external component, and vice versa, through one or more application program interfaces (APIs). For example, the application calling the external component may subscribe to an API of the external component that is configured to transmit data. In some embodiments, the external component receives tokens or other authentication credentials that are used to facilitate secure communication between the external component and an application calling the external component in view of the applications network security features or protocols (e.g., network firewall protocols). An example embodiment of an external component may include cloud components (e.g., AWS®).

The term "component metadata" refers to one or more data items or elements associated with a component that are collected and represented as part of a component metadata vector. The component metadata may refer to any information associated with the component represented by the component metadata vector, such as, for example, component dependency relationships, component object identifiers, performance metrics for the respective component (e.g., processor usage, access logs, crash reports, etc.), encryption keys, hardware requirements, associated computing devices, IP addresses, API compatibility, a host computing device's physical location (e.g., GPS coordinates, country name, etc.), the like, or combinations thereof. In some embodiments, the component metadata may be one or more encrypted or unencrypted files, for example, JSON files, XML files, SOAP files, HTML, files, the like, or combinations thereof. In some embodiments, component metadata may comprise one or more of a component metadata record identifier and an attribute associated with a component. In embodiments, the attribute may comprise an array of name and value pairs representative of properties of the component such as a component host name and/or geolocation. For example, component metadata may be structured with attributes associated with a host component as: Host {Id: graph-host-1 Attributes: [{name: geolocations, value: [us, eu]}, {name: name, value: hostx.foo.internal.company.net}, ]}. In some embodiments, component metadata may be fetched from a host system or server for one or more components.

The term "performance metric" refers to one or more data items that describes a measure related to one or more components that is used to evaluate and/or track the performance of the one or more components.

The term "multi-component system" refers to a system (e.g., a server system, a cloud-based system, etc.) where multiple components, multiple resources associated with components, multiple layers of components, and/or multiple layers of resources interact with one another in several complex manners.

The term "ownership" refers to identification of one or more client identifiers that are assigned as an owner, manager, and/or a creator of a component.

The term "component workflow" refers to a series of computing tasks or actions (e.g., component workflow actions) associated with a given component, where the series of computing tasks is executed in association with the given component upon detection of a specific component metadata condition.

The term "component metadata repository" refers to a database stored on memory device which is accessible by one or more computing devices for retrieval and storage of one or more component metadata, events, the like or combinations thereof. The component metadata repository may be configured to organize component metadata stored therein in accordance with a particular component metadata category. In some embodiments, the component metadata repository may be stored on a server remotely accessible by a computing device or on a memory device on-board the computing device.

The term "component metadata category" refers to a category (e.g., a classification) for one or more component metadata. For example, a component metadata category may provide context for respective one or more component metadata. For example, a component metadata may provide context with respect to a particular type of component metadata, a particular type of component dependency metadata, a particular type of component object, a particular application, a particular type of component dependency object, a particular network function, a particular API, a particular Web component, a particular geographical location, the like, or combinations thereof.

The term "component metadata condition" refers to one or more metadata and/or events associated with a component defined to facilitate triggering of one or more component workflows. For example, a particular combination of metadata and/or events associated with a given component may represent a component metadata condition for triggering a particular component workflow. In some embodiments, a given component metadata condition may be associated with a defined threshold criteria (e.g., a trigger threshold). In some embodiments, a given component metadata condition may be associated with a workflow trigger, where for example, the workflow trigger may be based at least part on the defined threshold criteria (e.g., trigger threshold).

The term "workflow trigger notification" refers to one or more data items and or elements transmitted to one or more computing devices that indicates that one or more component workflows has been triggered. For example, a workflow trigger notification may be transmitted to a client device to convey to a user associated with the client device that a particular component workflow has been triggered. In some embodiments, workflow trigger notification includes textual representation and or graphical representation. For example, in some embodiments, a workflow notification may include an icon and/or text.

The term "corrective action" refers to a component workflow action or component workflow action series configured to correct a component metadata condition. For example, in some embodiments, a corrective action may include one or more tasks or series of tasks configured to correct a component metadata condition. Examples of corrective action may include but not limited to disabling a component, disabling a service, disabling a library, the like and/or combinations thereof.

The term "component workflow action" refers to a task and/or associated instructions to be executed in association with a component. In some embodiments, a component workflow action may be associated with a component metadata condition. For example, in one or more embodiments, a workflow action may be triggered in response to detecting a component metadata condition.

The term "component workflow action series" refers to multiple component workflow actions that are to be performed in a defined sequence.

The term "component scorecard" refers to graphics information that quantifies data associated with one or more components. In one or more embodiments, a component scorecard includes one or more key performance indicators/performance metrics, one or more quality indicators, one or more quantity indicators, and/or one or more other metrics that quantifies data associated with one or more components.

The term "event" refers to one or more changes and/or one or more incidents related to one or more components. In some embodiments, an event may be associated with a unique identifier, one or more attributes, one or more tags, one or more classifications, one or more source identifiers, one or more object types, and/or other context data. Additionally, in some embodiments, an event may be triggered via one or more components. In some embodiments, an event may be associated with an event stream. In some embodiments, an event can be related to one or more changes and/or one or more incidents with respect to a component metadata repository. In some embodiments, an event can be related to a client device that interacts with a component. For example, in some embodiments, an event can be related to one or more changes and/or one or more incidents initiated via a display screen of a client device.

The term "event stream" refers to a collection of events related to one or more components. For example, an event stream can include a first event associated with at least one component, a second event associated with the at least one component, a third event associated with the at least one component, etc.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

Figure 1B:
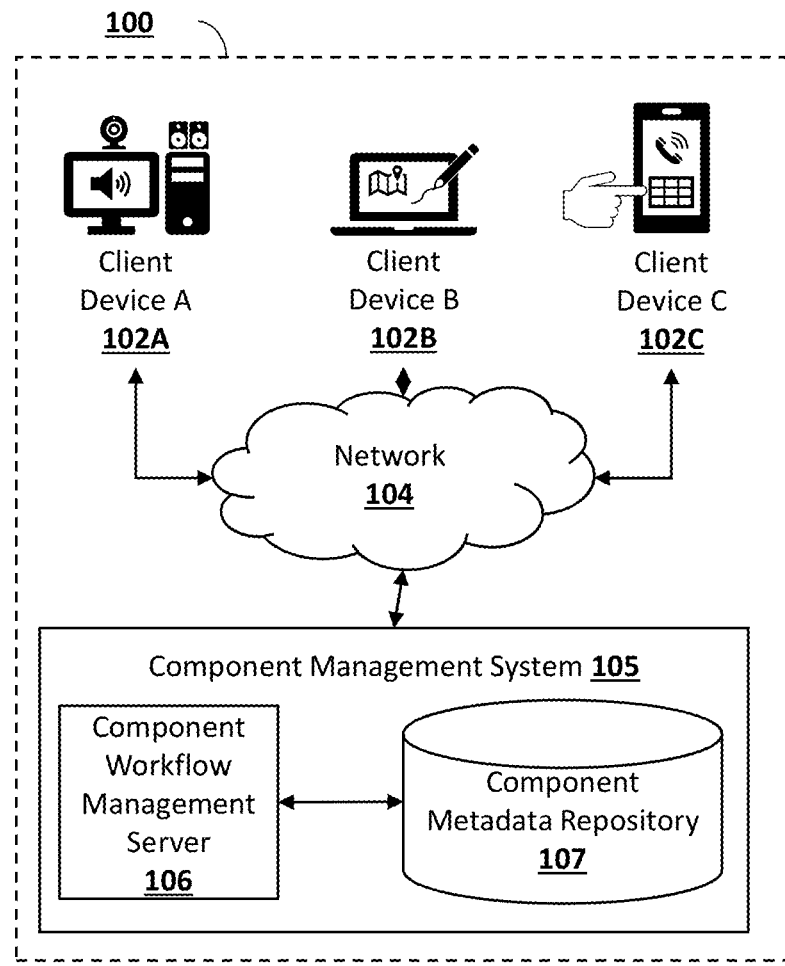
FIG. 1B is a block diagram of an example component management system within which one or more embodiments of the present disclosure may operate.

FIG. 1A and FIG. 1B illustrate an example system architecture 100 within which embodiments of the present disclosure may operate. As shown in FIGS. 1A and 1B, the system architecture 100 includes a component management system 105 configured to interact with one or more client devices 102A-C, such as client device 102A, client device 102B, and client device 102C. In one or more embodiments, the one or more client devices 102A-C may be configured to interact with one or more components managed by the component management system 105. For example, the component management system may manage a plurality of components (e.g., services, library, application data, and/or the like). In one or more embodiments, the one or more client devices 102A-C may be configured to send data to the one or more components managed by the component management system 105 and/or receive data from the one or more components managed by the component management system 105. As shown in FIG. 1A, a component may support, or be supported by, at least one other component (e.g., via dependency relationship). For example, a component 112 may be supported by, and communicably connected via at least a network, with a plurality of other components. For instance, a component 114 and a component 116 may each be configured to receive information signals from and/or transmit information signals to the component 112. For example, the component 114 may be called by another component (e.g., component 112) to fetch information about one or more additional components (e.g., component 118, component 120, and/or the like). In an embodiment, the component management system 105 can be associated with an application framework.

In one or more embodiments, the component management system 105 may be configured to receive one or more items of metadata and/or events (e.g., deployment events, alert events, incident events, the like, or combinations thereof) associated with a component (e.g., from the client devices 102A-C and/or other computing devices), update one or more component metadata records of a component metadata vector associated with the component, evaluate (e.g., periodically) each component metadata record to determine whether a given component metadata record satisfies (e.g., is below, is equal to, is above, and the like) a trigger threshold associated with the component, trigger a component workflow in response to determining that one or more items of metadata and/or events satisfies the trigger threshold (e.g., a metadata condition), and/or transmit one or more component workflow trigger notifications to a computing device. In one or more embodiments, a trigger threshold may be configurable (e.g., by a user associated with the respective component). An event may describe one or more changes and/or one or more occurrences related to one or more components. As an example, a deployment event may describe an implementation or deployment occurrence associated with one or more components (e.g., the execution of a software application on a server computing device to make the software application available to end-users). As another example, an alert event may describe a notification, message, alert, and/or the like with respect to an occurrence associated with one or more components. As yet another example, an incident event may describe the occurrence of an issue, problem, incident, and/or the like associated with one or more components.

In one or more embodiments, a component workflow may include a series of computing actions. In one or more embodiments, a component metadata vector may be associated with one or more component identifiers, where a component identifier is configured to identify a particular component. For example, in one or more embodiments, the one or more component identifiers may identify one or more components. In one or more embodiments, the one or more component metadata records may each include a component metadata record identifier and/or component metadata value. For example, in one or more embodiments, each component metadata record identifier may identify a component metadata record.

The component management system 105 may communicate with the client devices 102A-C using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JSON objects sent via a WebSocket channel. In some embodiments, the protocol is JSON over RPC, JSON over REST/HTTP, the like, or combinations thereof.

A client device from the one or more client devices 102A-C may include a mobile device, a smart phone, a tablet computer, a laptop computer, a wearable device, a personal computer, an enterprise computer, a virtual reality device, or another type of computing device. In one or more embodiments, a client device from the one or more client devices 102A-C includes geolocation circuitry configured to report a current geolocation of the client device. In some embodiments, the geolocation circuitry of the client device may be configured to communicate with a satellite-based radio-navigation system such as the global position satellite (GPS), similar global navigation satellite systems (GNSS), or combinations thereof, via one or more transmitters, receivers, the like, or combinations thereof. In some embodiments, the geolocation circuitry of the client device may be configured to infer an indoor geolocation and/or a sub-structure geolocation of the client device using signal acquisition and tracking and navigation data decoding, where the signal acquisition and tracking and the navigation data decoding is performed using GPS signals and/or GPS-like signals (e.g., cellular signals, etc.). Other examples of geolocation determination include Wi-Fi triangulation and ultra-wideband radio technology.

As shown in FIG. 1B, the component management system 105 may include a component workflow management server 106 and a component metadata repository 107. The component workflow management server 106 may be configured to update one or more component metadata vectors associated with a component identifier. For example, in one or more embodiments, the component workflow management server 106 may be configured to update one or more component metadata records of a component metadata vector associated with the component identifier. The component metadata repository 107 may store data associated with one or more component metadata vectors associated with the component management system 105. Additionally or alternatively, the component metadata repository 107 may store data associated with one or more event streams for the one or more component metadata vectors. For example, the component metadata repository 107 may store data associated with one or more component object data, component dependency objects, component dependency object identifiers, event streams, component dependency work graph structures, component dependency data type, the like, any division, and/or combinations thereof. The component metadata repository 107 may include one or more storage units, such as multiple distributed storage units that are connected through a computer network. Each storage unit in the component metadata repository 107 may store at least one of one or more data assets and/or one or more data about the computed properties of one or more data assets. Moreover, each storage unit in the component metadata repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

Figure 2:
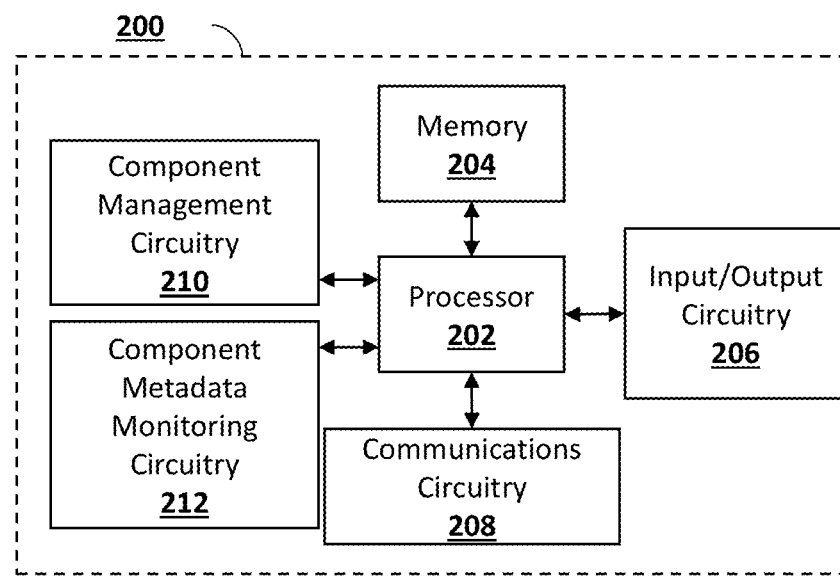
FIG. 2 is a block diagram of an example component management apparatus configured in accordance with one or more embodiments of the present disclosure.

The component workflow management server 106 may be embodied by one or more computing systems, such as apparatus 200 shown in FIG. 2. The apparatus 200 may include processor 202, memory 204, input/output circuitry 206, communications circuitry 208, component management circuitry 210, and component metadata monitoring circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The component management circuitry 210 may be any means such as a device or circuitry embodied in either hardware or a combination of hardware and software that is configured to manage updates to one or more component metadata records and/or triggering of one or more component workflows. In one or more embodiments, the component management circuitry 210 may be configured to receive an update to one or more component metadata records of a component metadata vector associated with a component identifier. Additionally, in one or more embodiments, the component management circuitry 210 may be configured to update the component metadata vector associated with the component identifier. For example, in one or more embodiments the component management circuitry 210 is configured to update one or more component metadata records of a component metadata vector (associated with a component identifier) in the component metadata repository 107 based at least in part on received update. Additionally, in one or more embodiments, the component management circuitry 210 may be configured to store received update and/or information in the component metadata repository 107.

The one or more component identifiers may, for example, identify one or more components. In some embodiments, the one or more component metadata records may include component metadata. In some embodiments, the component metadata may provide data associated with relationships, sources, targets, ownership, consumption, libraries, activities, attributes, incidents, events, performance metrics, communication channels, dashboards, data repositories, labels, descriptions, and/or other data related to the one or more component identifiers. Furthermore, in one or more embodiments, the one or more component metadata records may each include a unique component metadata record identifier. Additionally or alternatively, in one or more embodiments, the one or more component metadata records may each include a component metadata value. In one or more embodiments, the component management circuitry 210 may be configured to update the component metadata vector associated with the component identifier based at least in part on one or more items of metadata and/or one or more events associated with the component identifier. As noted above, the one or more items of metadata and/or one or more events associated with a component identifier may be received from the client devices 102A-C and/or other computing devices. For instance, one or more component metadata records that describe a performance metric associated with a component metadata vector associated with the component identifier may be updated based at least in part on the received one or more items of metadata and/or received one or more events.

The component metadata monitoring circuitry 212 may be any means such as a device or circuitry embodied in either hardware or a combination of hardware and software that is configured to determine and/or detect one or more component metadata conditions. In one or more embodiments, the one or more component metadata conditions may be associated with a component workflow trigger (e.g., trigger threshold) associated with a component identifier. Furthermore, in one or more embodiments, the component metadata monitoring circuitry 212 may be configured to trigger a component workflow associated with a component identifier. In an embodiment, the component metadata monitoring circuitry 212 may be configured to trigger a component workflow associated with a component identifier based at least in part on detecting a metadata condition associated with a component workflow trigger associated with the component identifier. For instance, in one or more embodiments, the component metadata monitoring circuitry 212 may be configured to trigger a component workflow based at least in part on determining that one or more component metadata records of the component metadata vector associated with the component identifier satisfies (e.g., is below, is equal to, is above, and the like) a trigger threshold. A component workflow may comprise one or more components workflow actions. For example, a component workflow may comprise a workflow trigger notification, opening/creating a communication channel (e.g., Slack® channel), generating/issuing a work request/solution request (e.g., Jira® ticket), and/or the like. In one or more embodiments, a component workflow may be a component workflow action series, where a component workflow action series describes multiple component workflow actions that are to be performed in a defined sequence. Accordingly, in one or more embodiments, a component workflow action series comprise a plurality of component workflow actions.

In one or more embodiments, the component metadata monitoring circuitry 212 may be configured to traverse a component metadata vector. In an embodiment, the component metadata monitoring circuitry 212 may be configured to traverse a component metadata vector to evaluate (e.g., periodically) the one or more component metadata records of the component metadata vector for a component metadata condition. In various embodiments, the component metadata monitoring circuitry 212 may be configured to, in response to determining a component metadata condition associated with a workflow trigger associated with a component identifier, to execute a component workflow action of a component workflow action series. In various embodiments, the component metadata monitoring circuitry 212 may be configured to traverse a given component metadata vector after updating the one or more component metadata records of the given component metadata vector.

In some embodiments, the one or more component metadata conditions may be configurable. For example, in one or more embodiments, a particular component metadata condition may be predefined and/or adjustable. For instance, in one or more embodiments, a particular component metadata condition associated with a particular component may be defined based at least in part on one or more performance metrics, where, for example, a particular metadata condition may describe a scenario where a metadata value for a particular component metadata record (e.g., performance metric) satisfies a corresponding trigger threshold. For instance, in one or more embodiments, a particular component metadata condition associated with a particular component may be defined based at least in part on particular combination of one or more metadata. For instance, in one or more embodiments, a particular component metadata condition associated with a particular component may be defined based at least in part on a particular combination of one or more events. For instance, in one or more embodiments, a particular component metadata condition associated with a particular component may be defined based at least in part on particular combination of events, metadata, and/or the like. For instance, in one or more embodiments, a particular component metadata condition associated with a particular component may be defined based at least in part on a component dependency relationship. In various embodiments, the one or more component metadata and/or component metadata conditions may be user defined, system defined, the like or the combinations thereof.

In one or more embodiments, a component workflow may be configurable. For example, in one or more embodiments, a particular component workflow may be predefined and/or adjustable. In some embodiments, a component workflow may be configurable by a user. As noted above, in one or more embodiments, a component workflow may include a component workflow action series (e.g., a plurality of component workflow actions that are to be performed in a defined sequence). For example, a component workflow may include n number of component workflow actions to be performed in a defined sequence. Furthermore, in one or more embodiments, each workflow action of a component workflow action series may be associated with (e.g. assigned to) a particular computing device and/or user. As yet another example, in one or more embodiments, each workflow action of the series of component workflow actions may be associated with a configurable completion deadline.

In some embodiments the component metadata monitoring circuitry 212 is configured (e.g., with the assistance of the component management circuitry 210) to update one or more component metadata records of a component metadata vector (associated with a component identifier) in the component metadata repository 107 based at least in part on received update. Additionally, in one or more embodiments, the component metadata monitoring circuitry 212 may be configured to store (e.g., with the assistance of the component management circuitry 210) received update and/or information in the component metadata repository 107. In some embodiments, the component metadata repository 107 may comprise one or more of a single unified repository, a single partitioned repository, or a plurality of isolated repositories comprising one or more partitions. An example embodiment of component metadata repository 107 may comprise separate partitions for isolating sensitive information, for example, classified government data.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
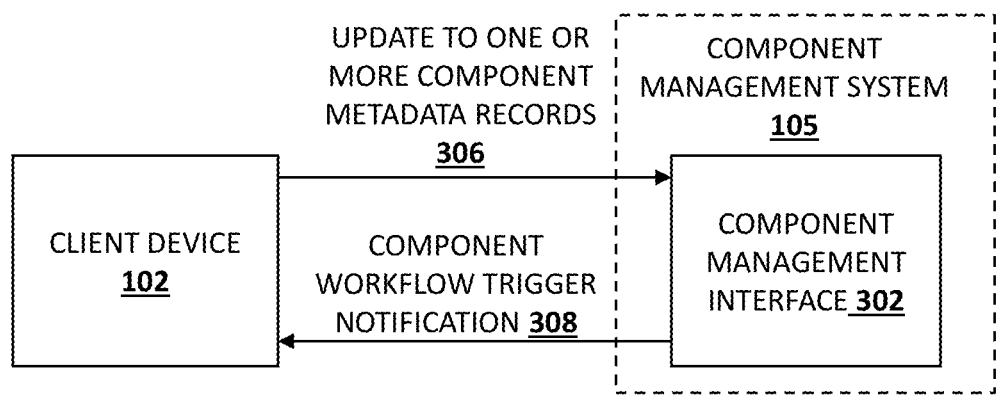
FIG. 3 illustrates an example system in accordance with one or more embodiments of the present disclosure.

Referring to FIG. 3, an example system 300 is presented in accordance with one or more embodiments of the present disclosure. The system 300 includes a computing device such as client device 102 (e.g., a client device from the one or more client devices 102A-C) and the component management system 105. In one or more embodiments, the component management system 105 includes a component management interface 302. The component management interface 302 may be, for example, a computing interface that facilitates exchange of data between the computing device (e.g., client device 102) and the component management system 105. In one or more embodiments, the component management interface 302 may facilitate management of component metadata and/or events and/or component workflows related to components associated with the client device 102. For example, in one or more embodiments, the component management interface 302 may facilitate management of update to one or more component metadata records of a component metadata vector associated with components associated with the client device 102. In an embodiment, the component management interface 302 may be an API (e.g., a component management API) that facilitates exchange of data between the client device 102 and the component management system 105. For instance, in an embodiment, the component management interface 302 may be an API (e.g., a component management API) to facilitate management of component metadata and/or events and/or component workflows related to components associated with the client device 102. In one or more embodiments, an API (e.g., a component management API) can be an interface that is consumed and/or employed by one or more systems (e.g., one or more of the client devices 102A-C and/or the component management system 105).

In an embodiment, the client device 102 may provide an update to one or more component metadata records 306 of a component metadata vector associated with a component identifier to the component management system 105. For instance, in an embodiment, the update to one or more component metadata records 306 provided by the client device 102 may be received by the component management interface 302 of the component management system 105. In one or more embodiments, the client device 102 may transmit the update to the one or more component metadata records 306 to the component management system 105 via the network 104. The update to one or more component metadata records 306 may include one or more items of metadata, events, the like, or combinations thereof associated with a component associated with the component identifier. Based at least in part on the update to the one or more component metadata records 306 received via the component management interface 302, the component management system 105 (e.g., the component management circuitry 210) may update the one or more component metadata records of the corresponding component metadata vector. In one or more embodiments, the component management system 105 (e.g., the component management circuitry 210) may update the one or more component metadata records of the component metadata vector associated with the component identifier in the component metadata repository 107. Additionally, in some embodiments, the component management system 105 (e.g., the component management circuitry 210) may update a component scorecard associated with the component associated with the component identifier, where a component scorecard may comprise one or more metrics associated with one or more components, such as performance metrics/indicators, quality indicators, quantity indicators, and/or the like.

Additionally, the component management system 105 (e.g., the component metadata monitoring circuitry 212) may traverse (e.g., periodically) the component metadata vector after updating the one or more component metadata records. In one or more embodiments, the component management system 105 (e.g., the component metadata monitoring circuitry 212) may traverse the component metadata vector to evaluate the one or more component metadata records of the component metadata vector. In one or more embodiments, the component management system 105 may evaluate each component metadata record for a component metadata condition associated with a component workflow trigger associated with the component identifier. In one or more embodiments, the component workflow trigger may be one or more trigger thresholds associated with the component identifier. For instance, in one or more embodiments, the component management system 105 (e.g., the component metadata monitoring circuitry 212) may evaluate a given component metadata record to determine whether one more items of metadata satisfies (e.g., is below, is equal to, is above, and the like) one or more trigger thresholds associated with the component. For example, in some embodiments, the one or more trigger thresholds may be based at least in part on one or more performance metrics. In one or more embodiments, the component workflow trigger associated with a component identifier may be a particular combination of events and/or metadata associated with a component configured as a trigger for a particular component workflow action series. For example, in one or more embodiments, missing or incomplete metadata may be defined as trigger for a particular component workflow action series.

In one or more embodiments, one or more component workflows (e.g., component workflow action series) may be triggered in response to determining a component metadata condition. As noted above, a component workflow may comprise various workflow actions such as a workflow trigger notification, opening/creating a communication channel (e.g., a Slack® channel), generating/issuing a work request/solution request (e.g., Jira® ticket), and/or the like.

In one or more embodiments, the component management system 105 may execute one or more component workflow actions of a component workflow action series based at least in part on determining a component metadata condition associated with a component workflow trigger associated with the component identifier. In one or more embodiments, the component management system 105 may transmit a component workflow trigger notification 308 to a computing device (e.g., client device 102A-C). For example, in one or more embodiments, in response to determining a component metadata condition with respect to a component identifier, the component management system 105 may transmit one or more component workflow trigger notifications 308 to one or more computing device (e.g., client device 102A-C).

Figure 4:
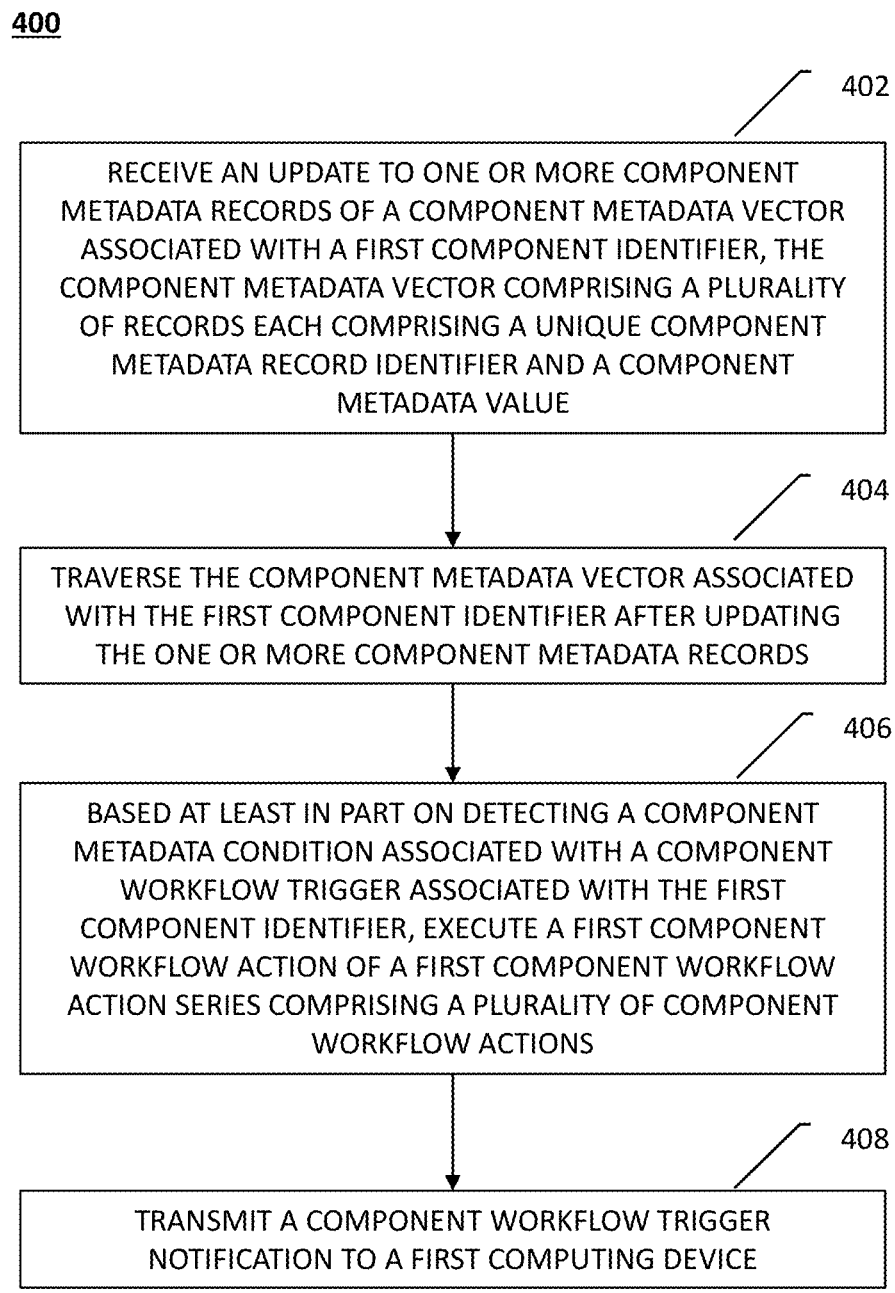
FIG. 4 illustrates a flowchart of example operations for performing in accordance with embodiments of the present disclosure.

FIG. 4 is a flowchart diagram of an example process 400 for use with embodiments of the present disclosure. It should be noted that while the process 400 is described with reference to a first component identifier, the process 400 may be performed for multiple component identifiers (e.g., unique component identifiers). The process 400 begins at operation 402 where an update to one or more component metadata records of a component metadata vector associated with a first component identifier is received. The component metadata vector comprises a plurality of records. Each record of the plurality of records comprises a unique component metadata record identifier and a component metadata value. The component metadata record identifier may identify one or more component metadata records. In one or more embodiments, the update to one or more component metadata records may be received from a client device and/or other computing devices. In one or more embodiments, the update to one or more component metadata records is received based at least in part on an event stream associated with a first component associated with the first component identifier. In one or more embodiments the component metadata vector associated with the first component identifier may be updated in a component metadata repository based at least in part on the received update.

In one or more embodiments, as depicted at operation 404, the component metadata vector associated with the first component identifier is traversed after updating the one or more component metadata records. In one or more embodiments, each component metadata record of the component metadata vector may be evaluated to determine (e.g., detect) one or more component metadata conditions (e.g., determine the occurrence of a metadata condition with respect to the component metadata vector). For example, in some embodiments, each component metadata record of the component metadata vector may be evaluated to determine whether a given component metadata record satisfies (e.g., is below, is equal to, is above, or the like) a particular trigger threshold associated with the first component identifier. For example, a given metadata associated with the first component identifier, such as a performance metric, may be evaluated to determine whether the performance metric satisfies a trigger threshold associated with the performance metric. In one or more embodiments, the component metadata condition may comprise missing or incomplete component metadata. In one or more embodiments, the component metadata condition may comprise an unreliable component upon which a first component associated with the first component is dependent. In one or more embodiments, the component metadata vector may comprise a plurality of component metadata conditions.

In one or more embodiments, based at least in part on detecting a component metadata condition associated with a component workflow trigger associated with the first component identifier, a first component workflow action series is triggered, where as noted above, examples of workflow actions of a workflow action series include workflow trigger notifications, opening/creating a communication channel (e.g., a Slack® channel), generating/issuing a work request/solution request (e.g., a Jira® ticket), one or more corrective actions, and/or the like. It is to be understood that workflow actions are not limited to the above example workflow actions.

In one or more embodiments, as depicted at operation 406, based at least in part on detecting a component metadata condition associated with a component workflow trigger associated with the first component identifier, a first component workflow action of a first component workflow action series comprising a plurality of component workflow actions is executed. For example, in one or more embodiments, a first component workflow action may comprise generating a workflow trigger notification. For instance, in one or more embodiments, in response to determining a component metadata condition with respect to the first component identifier, one or more component workflow trigger notifications 308 may be transmitted (e.g., by the component management system 105) to one more client devices (e.g., client device 102A-C) associated with one or more users associated with the component associated with the component identifier.

As another example, in one or more embodiments, a first component workflow action may comprise opening or creating an electronic or group based communication channel. As yet another example, in one or more embodiments, a first component workflow action may comprise generating or issuing a work request or solution request. As a further example, in one or more embodiments, a first component workflow action may comprise a corrective action. In one or more embodiments, the corrective action may comprise generating a workflow trigger notification. In one or more embodiments, the corrective action may comprise disabling one or more related components upon which a first component associated with the first component identifier is dependent. In one or more embodiments, one or more of the component metadata conditions and/or the component workflow action series may be configurable. In one or more embodiments, as depicted at operation 408, a component workflow trigger notification is transmitted to a first computing device.

Figure 5:
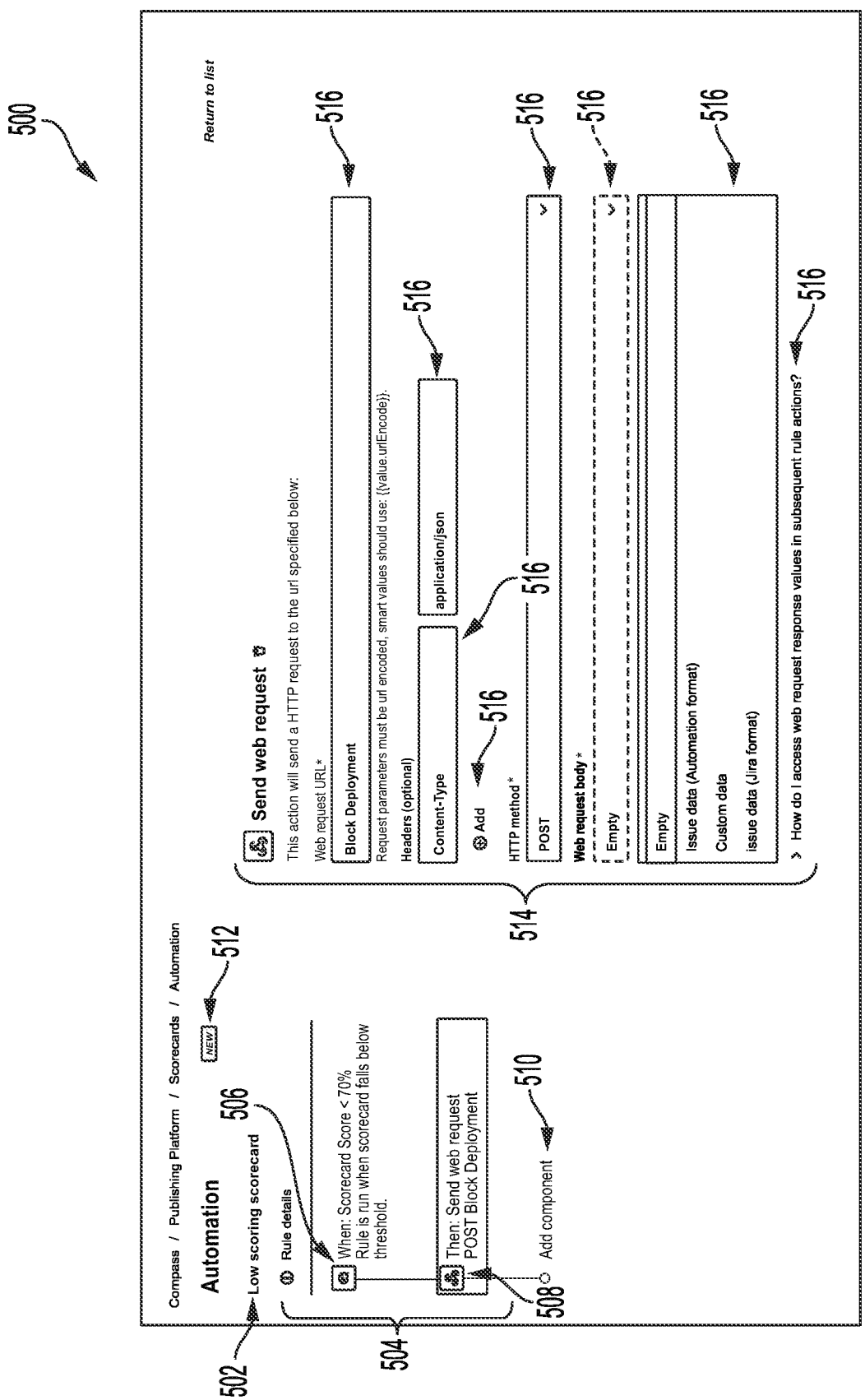
FIG. 5 illustrates an example user interface in accordance with one or more embodiments of the present disclosure.

Referring now to FIG. 5, an example user interface 500 is presented in accordance with one or more embodiments of the present disclosure. The user interface 500 can be, for example, an electronic interface (e.g., graphical user interface) of a client device (e.g., the client device 102). In one or more embodiments, the user interface 500 may include a new graphical control element 512. The new graphical control element 512 may be configured to facilitate creation of a new component metadata condition and/or component workflow by a user (e.g., a user having the requisite permissions). In one or more embodiments, the user interface 500 may include a workflow creation view 514 comprising one or more workflow creation graphical control elements 516 adapted for configuring component workflow actions or otherwise generating component workflow actions.

In one or more embodiments, the user interface 500 may provide a visualization of a component metadata condition and/or automated component workflow actions associated with a component metadata condition. In one or more embodiments, the user interface 500 may display a component metadata condition 502. In one or more embodiments, the component metadata condition 502 may be represented as a textual representation describing the component metadata condition 502.

In one or more embodiments, the user interface 500 may provide a component workflow view 504 for the component metadata condition 502. In some embodiments, the component workflow view 504 may include (i) a component workflow trigger 506 associated with the component metadata condition 502 and/or (ii) one or more component workflow actions 508 of a component workflow action series associated with the component metadata condition. In one or more embodiments, the component workflow trigger 506 may be represented as a textual representation describing the trigger threshold associated with the component metadata condition 502. In one or more embodiments, each of the one or more component workflow actions 508 may be represented as a textual representation describing the particular component workflow action.

In one or more embodiments, the user interface 500 may include a add component graphical control element 510. The add component graphical control element 510 may be configured to facilitate association of one or more components with the component metadata condition 502. For instance, a user may associate one or more components with the component metadata condition 502 at least in part via the add component graphical control element 510, such that the component workflow action series comprising the one or more component workflow actions 508 associated with the component metadata condition 502 is triggered in response to determining the component metadata condition 502 with respect to the associated components.

Figure 6:
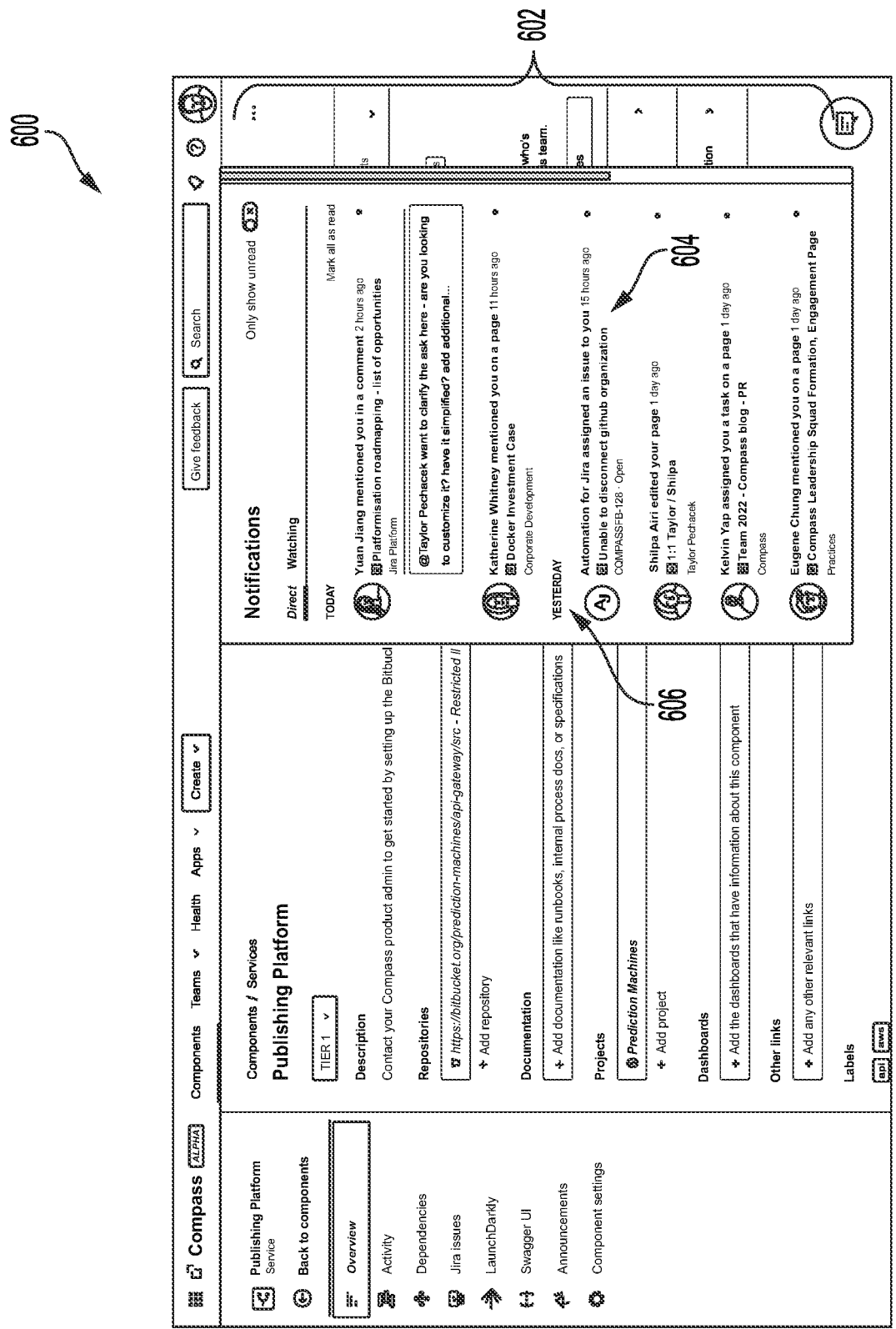
FIG. 6 illustrates an example user interface in accordance with one or more embodiments of the present disclosure.

Referring now to FIG. 6, an example user interface 600 is presented in accordance with one or more embodiments of the present disclosure. The user interface 600 can be, for example, an electronic interface (e.g., graphical user interface) of a client device (e.g., the client device 102). In one or more embodiments, the user interface 600 provides a notifications view 602 comprising a list of notifications. In one or more embodiments, the notifications view 602 may display component workflow trigger notifications (e.g., 604) associated with one or more components. In one or more embodiments, the notifications view 602 may depict one or more dates 606 associated with the corresponding component workflow trigger notifications. For example, for each component workflow trigger notification, the notifications view 602 may depict the date 606 a particular workflow trigger notification (e.g., 604) was generated and/or transmitted. In some embodiments, the component workflow trigger notifications may be grouped by the dates associated with the component workflow trigger notifications.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web components, web services, web microservices, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A system for triggering component workflows within a multi-component system, the system comprising one or more computers and one or more storage devices storing instructions that are operable, when executed by the one or more computers, to cause the one or more computers to:

receive an update to one or more component metadata records of a component metadata vector associated with a first component identifier, the component metadata vector comprising a plurality of records each comprising a unique component metadata record identifier and a component metadata value;

evaluate each component metadata record of the component metadata vector associated with the first component identifier by traversing the component metadata vector after updating the one or more component metadata records;

based at least in part on detecting a component metadata condition associated with a component workflow trigger associated with the first component identifier, execute a first component workflow action of a first component workflow action series comprising a plurality of component workflow actions; and transmit a component workflow trigger notification to a first computing device.

2. The system of claim 1, wherein the one or more storage devices store instructions that are operable, when executed by the one or more computers, to further cause the one or more computers to:

update the component metadata vector associated with the first component identifier in a component metadata repository based at least in part on the update.

3. The system of claim 1, wherein the first component workflow action comprises a corrective action.

4. The system of claim 3, wherein the corrective action comprises disabling one or more related components upon which a first component associated with the first component identifier is dependent.

5. The system of claim 1, wherein the component metadata condition comprises missing or incomplete component metadata.

6. The system of claim 1, wherein the component metadata condition comprises an unreliable component upon which a first component associated with the first component is dependent.

7. The system of claim 1, wherein one or more of the component metadata condition or the first component workflow action series is configurable.

8. The system of claim 1, wherein the component metadata vector comprises a plurality of component metadata conditions.

9. The system of claim 1, wherein the update to the one or more component metadata records is received based at least in part on an event stream associated with a first component associated with the first component identifier.

10. The system of claim 1, wherein the component metadata condition comprises a performance metric that is below a trigger threshold.

11. A computer-implemented method, comprising:

receiving, using processing circuitry, an update to one or more component metadata records of a component metadata vector associated with a first component identifier, the component metadata vector comprising a plurality of records each comprising a unique component metadata record identifier and a component metadata value;

evaluating each component metadata record of the component metadata vector associated with the first component identifier by traversing, using the processing circuitry, the component metadata vector after updating the one or more component metadata records;

based at least in part on detecting a component metadata condition associated with a component workflow trigger associated with the first component identifier, executing, using the processing circuitry, a first component workflow action of a first component workflow action series comprising a plurality of component workflow actions; and transmitting, using the processing circuitry, a component workflow trigger notification to a first computing device.

12. The computer-implemented method of claim 11, further comprising:

updating the component metadata vector associated with the first component identifier in a component metadata repository based at least in part on the update.

13. The computer-implemented method of claim 11, wherein the first component workflow action comprises a corrective action.

14. The computer-implemented method of claim 13, wherein the corrective action comprises disabling one or more related components upon which a first component associated with the first component identifier is dependent.

15. The computer-implemented method of claim 11, wherein the component metadata condition comprises missing or incomplete component metadata.

16. The computer-implemented method of claim 11, wherein the component metadata condition comprises an unreliable component upon which a first component associated with the first component is dependent.

17. The computer-implemented method of claim 11, wherein one or more of the component metadata condition or the first component workflow action series is configurable.

18. The computer-implemented method of claim 11, wherein the component metadata vector comprises a plurality of component metadata conditions.

19. The computer-implemented method of claim 11, wherein the update to the one or more component metadata records is received based at least in part on an event stream associated with a first component associated with the first component identifier.

20. The computer-implemented method of claim 11, wherein the component metadata condition comprises a performance metric that is below a trigger threshold.

21. A computer program product, stored on a computer readable medium, comprising instructions that when executed by one or more computers cause the one or more computers to:

receive an update to one or more component metadata records of a component metadata vector associated with a first component identifier, the component metadata vector comprising a plurality of records each comprising a unique component metadata record identifier and a component metadata value;

evaluate each component metadata record of the component metadata vector associated with the first component identifier by traversing the component metadata vector after updating the one or more component metadata records;

based at least in part on detecting a component metadata condition associated with a component workflow trigger associated with the first component identifier, execute a first component workflow action of a first component workflow action series comprising a plurality of component workflow actions; and transmit a component workflow trigger notification to a first computing device.

22. The computer program product of claim 21, further comprising instructions that when executed by the one or more computers cause the one or more computers to:

update the component metadata vector associated with the first component identifier in a component metadata repository based at least in part on the update.

23. The computer program product of claim 21, wherein the first component workflow action comprises a corrective action.

24. The computer program product of claim 23, wherein the corrective action comprises disabling one or more related components upon which a first component associated with the first component identifier is dependent.

25. The computer program product of claim 21, wherein the component metadata condition comprises missing or incomplete component metadata.

26. The computer program product of claim 21, wherein the component metadata condition comprises an unreliable component upon which a first component associated with the first component is dependent.

27. The computer program product of claim 21, wherein one or more of the component metadata condition or the first component workflow action series is configurable.

28. The computer program product of claim 21, wherein the component metadata vector comprises a plurality of component metadata conditions.

29. The computer program product of claim 21, wherein the update to the one or more component metadata records is received based at least in part on an event stream associated with a first component associated with the first component identifier.

30. An apparatus for triggering component workflows within a multi-component system, the apparatus comprising at least one processor and at least one memory including program code, the at least one memory and the program code configured to, with the processor, cause the apparatus to:

receive an update to one or more component metadata records of a component metadata vector associated with a first component identifier, the component metadata vector comprising a plurality of records each comprising a unique component metadata record identifier and a component metadata value;

evaluate each component metadata record of the component metadata vector associated with the first component identifier by traversing the component metadata vector associated with the first component identifier after updating the one or more component metadata records;

based at least in part on detecting a component metadata condition associated with a component workflow trigger associated with the first component identifier, execute a first component workflow action of a first component workflow action series comprising a plurality of component workflow actions; and transmit a component workflow trigger notification to a first computing device.

* * * * *